United States Patent [19]

Yamamoto et al.

[11] Patent Number: 4,594,079
[45] Date of Patent: Jun. 10, 1986

[54] GAS SEPARATING MEMBER AND METHOD FOR MANUFACTURE THEREOF

[75] Inventors: Minoru Yamamoto; Jiro Sakata, both of Aichi, Japan

[73] Assignee: Kabushiki Kaisha Toyota Chuo Kenkyusho, Aichi, Japan

[21] Appl. No.: 682,145

[22] Filed: Dec. 17, 1984

[30] Foreign Application Priority Data

Dec. 23, 1983 [JP] Japan .................. 58-243600

[51] Int. Cl.⁴ .................................... B01D 53/22
[52] U.S. Cl. ........................... 55/158; 427/40; 427/41; 428/36; 428/315.5
[58] Field of Search ............... 55/16, 158; 210/500.2; 427/38, 40, 41, 196, 407.2, 412.3, 412.5; 428/36, 304.4, 315.5, 315.7, 316.6

[56] References Cited

U.S. PATENT DOCUMENTS

| | | | |
|---|---|---|---|
| 3,754,375 | 8/1973 | Bouchilloux et al. | 55/158 X |
| 3,980,456 | 9/1976 | Browall | 428/315.5 X |
| 4,132,829 | 1/1979 | Hudis | 427/41 X |
| 4,239,793 | 12/1980 | Matsuura et al. | 55/158 X |
| 4,393,113 | 7/1983 | Sugie et al. | 55/158 X |
| 4,410,338 | 10/1983 | Yamamoto et al. | 55/16 X |
| 4,444,662 | 4/1984 | Conover | 55/158 X |
| 4,465,738 | 8/1984 | Chang | 427/41 X |
| 4,479,982 | 10/1984 | Nilsson et al. | 427/41 |
| 4,483,901 | 11/1984 | Okita et al. | 55/158 X |

FOREIGN PATENT DOCUMENTS

| | | | |
|---|---|---|---|
| 103788 | 8/1979 | Japan | 55/158 |
| 59210 | 4/1984 | Japan | 55/158 |

Primary Examiner—Robert Spitzer
Attorney, Agent, or Firm—Parkhurst & Oliff

[57] ABSTRACT

A gas separation member comprises a porous substrate, e.g., a membrane or a wall, and a polymer film deposited by plasma polymerization on the surface of the substrate and composed of at least two layers, i.e., a first layer contiguous with the substrate and a second layer superimposed on the first layer. The polymer film of the first layer possesses a uniform chemical composition or chemical structure in the direction of film thickness, while the polymer film of the second layer has a chemical composition or chemical structure which changes continuously or stepwise in the direction of film thickness. The gas separation member combines high gas separation factor and a high gas permeation rate, permitting separation of a specific gas in a concentrated form from a mixed gas. It also excels in weatherability.

14 Claims, 3 Drawing Figures

GAS SEPARATING MEMBER AND METHOD FOR MANUFACTURE THEREOF

BACKGROUND OF THE INVENTION

This invention relates to a member for separating mixed gases in a concentrated form by utilizing differences in the rates of permeation of the gases through a film and to a method for the manufacture of the gas separating member.

Searches are now under way for methods of separating oxygen and nitrogen from air and obtaining air rich in oxygen, methods of evacuating a room of excess carbon dioxide gas and ensuring the necessary oxygen supply for the room, and methods for separating hydrogen in a concentrated form from various hydrogen-containing mixed gases emanating from various manufacturing processes and permitting disposal of gas by-products entrained by the mixed gases. It is highly important that these processes of gas separation should be effected without consuming extra energy.

Various methods are available to carry out such gas separation, including absorption, adsorption, diffusion, and deep-freeze separation. From the energy-saving point of view, a diffusion method which makes effective use of film separation techniques holds great promise. However, the separating members developed to date possess low gas separation factors or exhibit low degrees of permeability to gases and therefore have found practical utility only in limited applications.

The inventors have disclosed in U.S. Pat. No. 4,410,338 a novel gas separating member which outperforms the conventional gas separating members in gas separation capacity and permeability to gas and enjoys high mechanical strength, and a method for manufacture of the gas separating member. The gas separating member so disclosed undeniably outperforms the conventional counter-types in terms of gas separation capacity and permeability to gas. As viewed from the energy-saving point of view, however, it has room for further improvement.

Empirically, it has been found that a film of high gas separation capacity cannot easily be improved in permeability to gas and a film of high permeability to gas has low gas separation capacity. It has been an extremely difficult task, therefore, to improve a given gas separating member in both gas separation capacity and permeability to gas. As a material intended for the solution of this problem, a gas separating member incorporating at least two polymer films has been proposed (Japanese Patent Application Laid-open Number 1982/30528). This gas separating member has the drawback that, under certain mechanical or thermal conditions, the first and second layers thereof may separate from each other. This layer separation may result in serious impairment of the performance of the film separating material.

SUMMARY OF THE INVENTION

An object of this invention, therefore, is to provide a novel gas separating member which remarkably surpasses the conventional gas separating materials in gas separation capacity and permeability to gas and excels in mechanical strength, weatherability, and durability.

Another object of this invention is to provide a method for the manufacture of such a gas separating material.

The inventors have found that a gas separating material which possesses high gas separating capacity, offers high permeability to gas, and does not deteriorate under harsh mechanical and thermal conditions is obtained by using at least two plasmapolymerized layers and causing the chemical composition or chemical structure of the polymer film of the second layer to change gradually from that of the film of the first layer. (For simplicity, throughout the present specification and claims, the term "chemical composition" is taken to mean chemical composition and/or chemical structure.)

The gas separating member of the present invention comprises a porous substrate (for example, a membrane or wall) with a polymer film deposited by plasma polymerization on the surface of the substrate and having at least two layers, i.e., a first layer contiguous with the substrate and a second layer superimposed on the first layer. The polymer film of the first layer possesses a substantially uniform chemical composition in the direction of film thickness, while the chemical composition of the polymer film of the second layer changes substantially continuously or stepwise in the direction of film thickness.

In a preferred embodiment of this invention, the gas separating member has a film of organosilane resin as the polymer film of the first layer and a plasma polymerization product of a combination of at least two kinds of organosilane monomer as the polymer film of the second layer. Alternatively, the second layer may be formed of a plasma polymerization product of an organosilane monomer and a saturated hydrocarbon, an unsaturated hydrocarbon, an aromatic hydrocarbon, derivatives thereof, or a mixture thereof. In another preferred embodiment of the invention, the polymer film of the first layer may be formed of an organosilane resin and the polymer film of the second layer formed of a plasma polymerization product of an organosilane-fluorocarbon having a continuously changing chemical composition.

The gas separating member of the present invention is produced by depositing a first organic monomer by plasma polymerization on the surface of a porous substrate, e.g., a membrane or a wall, thereby forming a first polymer layer possessing a substantially uniform chemical composition in the direction of film thickness. A second organic monomer is then introduced and the first and second organic monomers are plasma polymerized while the mixing ratio of the first organic monomer and the second organic monomer is changed continuously or stepwise, thereby forming a second polymer layer having a chemical composition changing substantially continuously or stepwise in the direction of film thickness. An organosilane monomer is used advantageously as the first organic monomer. As the second organic monomer, one or more organosilane monomers different from the organosilane monomer uesd for the first organic monomer or a saturated hydrocarbon, an unsaturated hydrocarbon, an aromatic hydrocarbon, a derivative thereof, or a mixture thereof is used advantageously. More advantageously, a second polymer layer having a continuously changing chemical composition may be formed using fluorocarbon as the second organic monomer and plasma polymerizing the two monomers while continuously changing the mixing ratio of the organosilane monomer of the first organic monomer and the fluorocarbon of the second organic monomer.

DETAILED DESCRIPTION OF THE PREFERRED EMBODIMENTS

Figure 1:
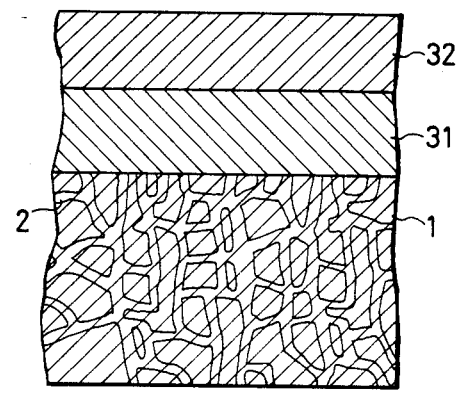
FIG. 1 represents a schematic cross section of a gas separating member of the present invention.

In the gas separating member of this invention illustrated in FIG. 1, 1 denotes a porous substrate, e.g., a membrane or a wall, and 31 and 32 denote first and second polymer films formed by plasma polymerization on the surface of the aforementioned substrate 1. The porous substrate 1 shares the role of sustaining the mechanical strength of the gas separating member. It is a porous film or a porous wall containing through pores 2 ranging in a diameter from some tens of Angstroms (Å) to several micrometers. To be specific, a sintered piece obtained by sintering particles of metal, ceramic, or polymer, a textile piece formed by knitting or weaving fibers or piling fibers in the form of felt, a porous polymer film, a porous glass film and other similar compositions can be used as the substrate 1.

The shape of the substrate 1 may be a flat plate, a tube, or some other convenient form. In the method of this invention, since the polymer films 31, 32 are formed by plasma polymerization, the polymer films can be formed rather easily on a relatively complicated surface such as the surface of a tube or even a surface rich in irregularities.

For the polymer films 31, 32 to be stably formed in holes in the surface of the substrate, when these holes are circular, they preferably should have a diameter of not more than some thousands of Angstroms. When the holes are rectangular or elliptic, their minor diameters preferably should be not more than 1000 Angstroms. Examples of substrates used advantageously herein include porous acetylcellulose film, porous polysulfone film, and porous polycarbonate film having a multiplicity of through holes some tens to some hundreds of Angstroms in diameter uniformly distributed therein, porous polypropylene film having through holes some hundreds of Angstroms in diameter formed therein by stretching, porous glass film having pores some tens to some thousands of Angstroms in diameter formed therein by a pore-forming treatment utilizing the phenomenon of phase separation of sodium borosilicate glass, and porous polymers produced by a pore-forming treatment utilizing the decomposition of multi-phase polymers. In the porous substrates cited above, the porous glass film, porous polysulfone film, and porous polypropylene film are particularly desirable. Although the thickness of the substrate 1 is not crucial, it is generally in the range of 10 to 1000 micrometers.

The plasma polymerization which forms the polymer films 31, 32 on the surface of the substrate 1 may be a method wherein a given organic monomer is introduced into plasma, thereby activating the organic monomer and converting it into a radical or ion and inducing polymerization thereof. To be more specific, an electric field is exerted upon a gas of low pressure so as to excite the gas to a high energy state and convert the gas into a disassociated state, i.e., the plasma state, containing electrons, ions, and radicals in abundance. The organic monomer then is introduced into the gas in this state. This organic monomer is activated as though it were a mass of radicals or ions. As the unreacted monomer is sequentially polymerized in this manner, a polymer film is formed on the surface of a porous substrate which is placed within the chamber containing the plasma. The exertion of the electric field can be effected by the inner electrode method or the electrodeless method. With the inner electrode method, an electric field of DC, AC, or high frequency can be used. With the electrodeless method, an electric field of high frequency can be used. Further, the method widely known by the designation of reverse spattering may be used instead of the aforementioned inner electrode method. Thus, the plasma polymerization contemplated by this invention can be effected by reverse spattering.

Examples of the organic monomer for plasma polymerization include organosilanes such as hexamethyldisiloxane, octamethylcyclotetrasiloxane, hexamethylcyclotrisiloxane, tetramethylsilane, diallyldimethylsilane, trimethylmethoxysilane, trimethylethoxysilane, dimethyldimethoxysilane, and dimethyldiethoxysilane; fluorocarbons such as tetrafluoromethane, tetrafluoroethylene, perfluoropropane, and perfluorobenzene and derivatives thereof; unsaturated hydrocarbons such as 1-hexene, cyclohexene, ethylene, propene, acetylene, and butadiene, and derivatives thereof; saturated hydrocarbons such as methane, ethane, propane, butane, pentane, and hexane, and derivatives thereof; aromatic hydrocarbons such as benzene, toluene, and styrene, and derivatives thereof; heterocyclic compounds such as furan and derivatives thereof; and other organic monomers which have been reported as possessing the ability to form a film by plasma polymerization. The polymer film which is formed directly on the surface of the porous substrate, namely the polymer film of the first layer 31, however, is preferably a film of organosilane resin. Examples of the organosilane type organic monomer preferably used for the formation of the polymer film of the first layer are hexamethyldisiloxane and octamethylcyclotetrasiloxane.

The polymer film which is formed on the aforementioned polymer film 31 of the first layer and which has its chemical composition changed continuously or stepwise in the direction of film thickness, namely the polymer film 32 of the second layer, is a polymer to be formed by plasma polymerizing a mixed organic monomer comprising the same organic monomer as used in the formation of the polymer film of the first layer, namely, the first organic monomer, and one or more organic monomers other than the first organic monomer, namely, the second organic monomer. The second organic monomer can be selected from the wide variety of organic monomers enumerated above. In these organic monomers, particularly desirable are organosilanes such as diallyldimethylsilane and tetramethylsilane; fluorocarbons such as tetrafluoromethane, tetrafluoroethylene, perfluorobenzene, and 2,3,4,5,6-pentafluorostyrene; and furan, acetylene, and methane.

The total thickness of the polymer films of this invention is not more than 10,000 Angstroms. It generally is considered appropriate when it falls in the range of 100 to 10,000 Angstroms. Experimentally, various polymer films were formed on a glass sheet instead of the usual substrate, under the same plasma polymerization conditions as used in the method of this invention and the thickness of these polymer films determined through the measurement of interference patterns under an interference microscope. The polymer films produced under the plasma polymerization conditions involved in the working examples to be cited hereinafter had thicknesses ranging from 200 Angstroms to 5000 Angstroms. Generally, the polymer film of the second layer has a thickness of about 10 to 1000 Angstroms, preferably about 20 to 500 Angstroms.

Optionally, on the polymer film of the second layer, another polymer film of a substantially uniform chemical composition formed of the plasma polymerization product of the second organic monomer or some other monomer may be deposited as a third layer.

Figure 2:
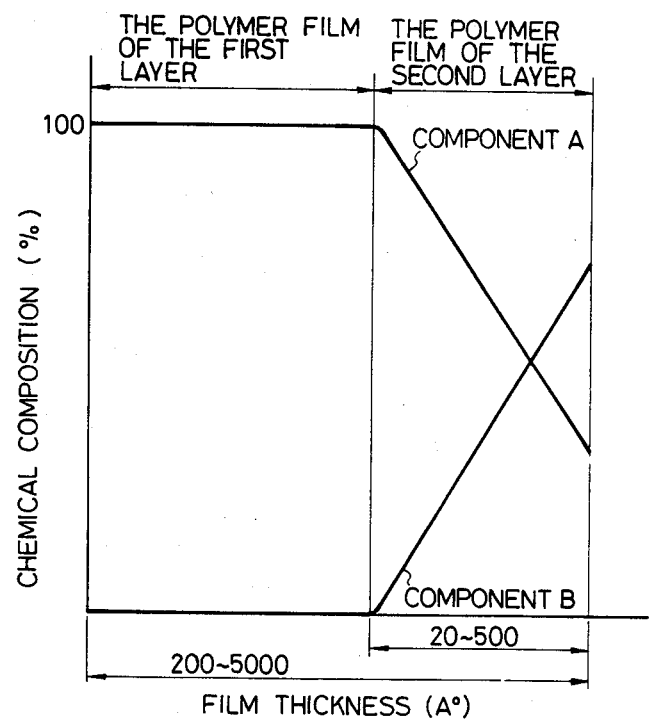
FIG. 2 illustrates a typical distribution of chemical composition in the direction of film thickness of the polymer film in the gas separating member of the present invention.

The gas separating member of this invention can be manufactured by introducing the first organic monomer into a container holding therein the aforementioned porous substrate 1, subjecting the monomer to plasma polymerization for a prescribed time, generally ranging from 1 to 30 minutes, thereby forming on the surface of the aforementioned substrate the polymer film 31 of the first layer having a substantially uniform chemical composition in the direction of film thickness, then introducing the second organic monomer, changing the mixing ratio of the first organic monomer and the second organic monomer substantially continuously or stepwise, and subjecting the first and second organic monomers to plasma polymerization for a prescribed time, generally ranging from 1 to 30 minutes, and thereby forming the polymer film 32 of the second layer having a chemical composition continuously or stepwise changed in the direction of film thickness. FIG. 2 graphically depicts a process in which the first organic monomer (Component A) is introduced and subjected to plasma polymerization to form the polymer film of the first layer on the surface of the substrate, then the second organic monomer (Component B) is introduced and Component A and Component B, in a continuously changing mixed ratio, are subjected to plasma polymerization to form the polymer film of the second layer on the polymer film of the first layer.

In the working examples cited below, the most difficult separation of oxygen from nitrogen was tried. It will be understood that the gas separating member of this invention is also usable for mutual separation of other gases such as, for example, hydrogen, helium, carbon monoxide, and carbon dioxide which have dissimilar molecular weights and properties.

Since the gas separating member of this invention possesses two or more kinds of polymer films, it permits simultaneous fulfilment of the two requirements, high gas separation capacity and high permeability to gas, which it has been found difficult to attain using a gas separating member having one polymer film. Structurally, the combination of the two polymer films is not different from the one-layer polymer film because the polymer film of the second layer is formed by gradually (continuously or stepwise) changing the chemical composition of the polymer film of the first layer. Even after protracted use, therefore, the two polymer films do not yield to layer separation or to quality deterioration. Owing to the high gas separation factor and the high rate of permeation, the gas separating member of this invention enables a specific component gas to be separated in a concentrated form from a mixed gas at a low power consumption. It also promises potential miniaturization of the device.

Figure 3:
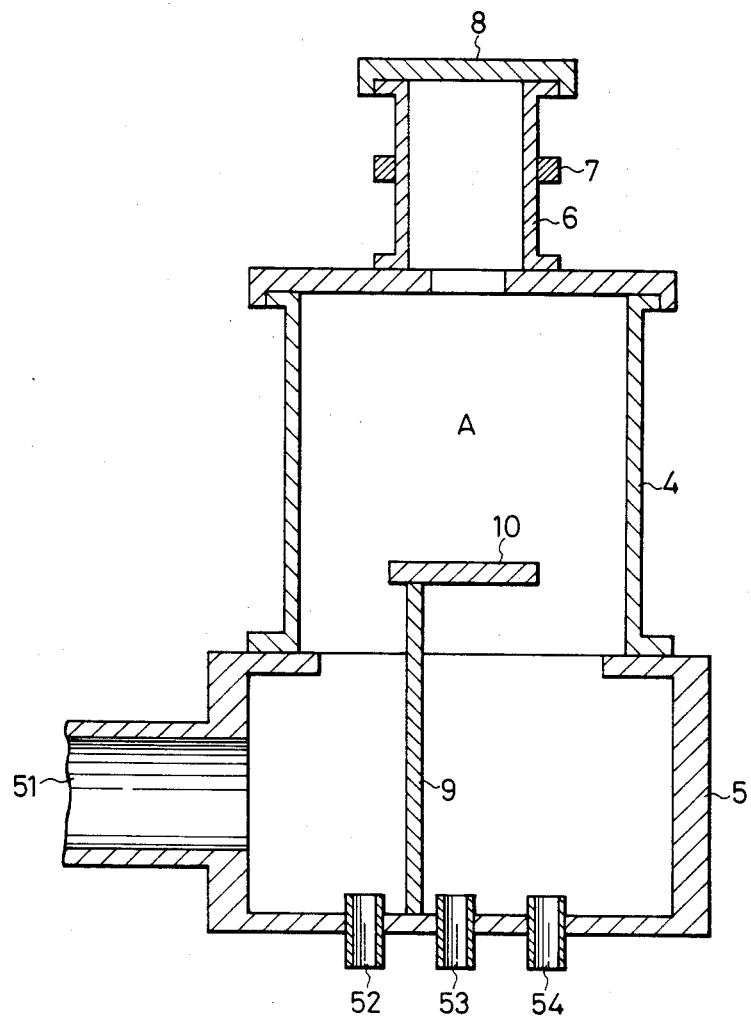
FIG. 3 is a schematic sectional front view of a plasma generating device usable in the method of the present invention.

Now, the present invention will be described more specifically below with reference to working examples and comparative experiments. A cross section of the plasma generating device used in the following working examples is schematically illustrated in FIG. 3.

The plasma generating device comprises a reaction vessel 6 of glass about 8 cm in diameter and about 20 cm in height with a metallic blind lid 8 disposed at the top thereof, a metallic container 4 about 30 cm in diameter and about 35 cm in height for carrying thereon the reaction vessel 6 and accommodating therein a sample base 10, a metallic container 5 about 40 cm in edge length and about 25 cm in height for supporting thereon the metallic container 4, and an electrode 7 of copper plate wrapped around the reaction vessel 6 in the middle part thereof. The metallic container 5 is provided with passages 52, 54 for introduction of organic monomer gases, a passage 53 for connection to pressure gauges serving to monitor the pressure inside the containers 4, 5 and 6, and a gas discharge passage 51 communicating with a vacuum pump. The specimen base 10 is attached to a support bar 9 inside the metallic container 4.

EXAMPLE 1

A porous glass tube of the shape of a hollow fiber 250 $\mu$m in outside diameter, 15 $\mu$m in wall thickness, and 20 cm in length was used as a porous substrate. This substrate was set in place on the specimen base 10 of the plasma generating device illustrated in FIG. 3. By the operation of a vacuum pump (not shown), the common interior A of the containers 4, 5 and 6 was evacuated of air through the gas discharge passage 51. While the evacuation by the vacuum pump was continued, hexamethyldisiloxane was introduced as the first organic monomer through the passage 52 such that the internal pressure was kept at 0.1 Torr as measured with a pressure gauge (not shown) connected through the passage 53. In this condition, a high frequency voltage of 13.56 MHz was applied to the electrode 7 to apply electric power of 100 watts to cause plasma polymerization for two minutes and consequently form the polymer film of the first layer on the surface of the aforementioned substrate. With the aforementioned application of the high frequency voltage continued, the plasma polymerization was carried out for one minute while decreasing the introduced amount of hexamethyldisiloxane at a rate such that it would reach 0 in one minute and, at the same time, introducing through the passage 54 diallyldimethylsilane as the second organic monomer in an amount gradually increased so that the total organic monomer pressure would remain at 0.1 Torr. Thus, the polymer film of second layer was formed on the aforementioned polymer film of first layer, to complete a gas separating member.

The gas permeation rate and the gas separation factor of this gas separating member were as follows:

Gas separation factor ($O_2/N_2$): 4.5
Oxygen permeation rate: $1.0 \times 10^{-4}$ $cm^3/cm^2 \cdot sec \cdot cmHg$.

EXAMPLE 2

A gas separating member of this invention was produced by forming polymer films on a substrate by following the procedure of Example 1, except that the pressure of the first organic monomer was kept at 0.05 Torr during the formation of the first layer, the total pressure of the organic monomers was kept at 0.05 Torr during the formation of the second layer, and the duration of the formation of the second layer was fixed at 30 seconds. The gas permeation rate and the gas separation factor of this gas separating member were a follows:

Gas separation factor ($O_2/N_2$): 3.7
Oxygen permeation rate: $2.0 \times 10^{-4}$ cm$^3$/cm$^2$·sec·cmHg.

EXAMPLE 3

The same porous glass tube of the shape of a hollow fiber as used in Example 1 was used as a porous substrate. This substrate was set in place on the specimen base 10 and the interior of the containers 4, 5 and 6 was evacuated of air by the vacuum pump. With the evacuation by the vacuum pump continued, hexamethyldisiloxane was introduced through the passage 52 as the first organic monomer such that the pressure inside would remain at 0.1 Torr. In this condition, a high frequency voltage of 13.56 MHz was applied to the electrode 7 to apply electric power of 100 watts and cause plasma polymerization for two minutes and consequently form the polymer film of first layer on the surface of the aforementioned substrate. Then, with the application of the high frequency voltage continued, the plasma polymerization was carried out for 30 seconds while continuously decreasing the rate of the introduction of hexamethyldisiloxane so that it would reach 0 in 30 seconds and, at the same time, slowly introducing tetrafluoroethylene as the second organic monomer through the passage 54 so that the total pressure of the two monomers would remain at 0.1 Torr. Thus, a gas separating member of this invention was produced by forming the polymer films on the substrate.

The gas separation factor and the oxygen permeation rate of this gas separating member were as follows:

Gas separation factor ($O_2/N_2$): 3.7
Oxygen permeation rate: $1.9 \times 10^{-4}$ cm$^3$/cm$^2$·sec·cmHg.

EXAMPLE 4

A gas separating member of this invention was produced by following the procedure of Example 1, except that tetrafluoromethane was used as the second organic monomer.

The gas separation factor and the oxygen permeation factor of this gas separating member were as follows:

Gas separation factor ($O_2/N_2$): 3.0
Oxygen permeation rate: $4.0 \times 10^{-4}$ cm$^3$/cm$^2$·sec·cmHg.

Comparative Experiment 1

A polymer film was formed on the same porous glass tube of the shape of a hollow fiber as used in Example 1 by following the procedure 1, except that only hexamethyldisiloxane was used as an organic monomer and the duration of plasma polymerization was changed to three minutes.

The gas separation factor and the oxygen permeation rate of this gas separating member were as follows:

Gas separation factor ($O_2/N_2$): 2.5
Oxygen permeation rate: $4.0 \times 10^{-4}$ cm$^3$/cm$^2$·sec·cmHg.

While the present invention has been described with respect to specific embodiments and examples, it is to be understood that various changes could be made thereto by one of ordinary skill in the art without exceeding the scope of the present invention as set forth in the following claims.

What is claimed is:

1. A gas separating member, comprising:
a porous substrate and a polymer film deposited by plasma polymerization on a surface of said substrate, said film comprising at least two layer parts, namely, a first layer part contiguous with said substrate and a second layer part superimposed on said first layer part, said first layer part being a plasma polymerization product of a first organic monomer and having a substantially uniform chemical composition in the direction of film thickness and said second layer part being a plasma polymerization product of said first organic monomer and at least one additional organic monomer, the amount of said first organic monomer being gradually decreased and that of said additional organic monomer being gradually increased, and thus having a chemical composition which changes substantially continuously in the direction of film thickness.

2. A gas separating member according to claim 1, wherein said first layer part comprises a film of organosilane resin.

3. A gas separating member according to claim 2, wherein said second layer part comprises a plasma polymerization product of an organosilane monomer and a fluorocarbon.

4. A gas separating member according to claim 1, wherein said second layer part comprises a plasma polymerization product of at least two organosilane monomers.

5. A gas separating member according to claim 1, wherein said second layer part comprises a plasma polymerization product with an organosilane monomer and at least one member of the group consisting of saturated hydrocarbons, unsaturated hydrocarbons, aromatic hydrocarbons, and derivatives thereof.

6. A gas separating member according to claim 1, wherein said substrate is selected from the group consisting of membranes and walls.

7. A gas separating member according to claim 1, wherein said polymer film comprises three layer parts, namely, said first and second layer parts, and a third layer part superimposed on said second layer part, said third layer part being a plasma polymerization product of said additional organic monomer and having a substantially uniform chemical composition in the direction of film thickness.

8. A method for manufacturing a gas separating member, comprising the steps of:
depositing a first organic monomer on a surface of a porous substrate by plasma polymerization, thereby to form a first layer part of a polymer film, said first layer part having a substantially uniform chemical composition in the direction of film thickness, then depositing said first organic monomer and at least one additional organic monomer on a surface of said first layer part by plasma polymerization while changing the mixing ratio of said first organic monomer and said additional organic monomer by gradually decreasing the amount of said first organic monomer and gradually increasing the amount of said additional organic monomer, thereby to form a second layer part of said polymer film, said second layer part having a chemical composition varying substantially continuously in the direction of film thickness.

9. A method according to claim 8, wherein said first organic monomer comprises an organosilane monomer.

10. A method according to claim 9, wherein said additional organic monomer comprises at least one organosilane monomer different from said first organic monomer.

11. A method according to claim 9, wherein said additional organic monomer is selected from the group consisting of saturated hydrocarbons, unsaturated hydrocarbons, aromatic hydrocarbons, and derivatives thereof.

12. A method according to claim 9, wherein said additional organic monomer comprises a fluorocarbon.

13. A method according to claim 8, wherein said porous substrate is selected from the group consisting of membranes and walls.

14. A method according to claim 8, further comprising depositing said additional organic monomer on a surface of said second layer part by plasma polymerization, thereby forming a third layer part having a substantially uniform chemical composition in the direction of film thickness.

* * * * *